United States Patent
Laffra

(10) Patent No.: US 12,236,234 B2
(45) Date of Patent: Feb. 25, 2025

(54) METHOD AND SYSTEM FOR PROVIDING ACTIONABLE CORRECTIONS TO AND CODE REFACTORING OF EXECUTABLE CODE

(71) Applicant: JPMorgan Chase Bank, N.A., New York, NY (US)

(72) Inventor: Chris Laffra, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 102 days.

(21) Appl. No.: 18/112,354

(22) Filed: Feb. 21, 2023

(65) Prior Publication Data
US 2024/0281246 A1    Aug. 22, 2024

(51) Int. Cl.
| G06F 8/72 | (2018.01) |
| G06F 8/30 | (2018.01) |
| G06F 8/65 | (2018.01) |
| G06F 11/34 | (2006.01) |
| G06N 20/00 | (2019.01) |

(52) U.S. Cl.
CPC .................. *G06F 8/72* (2013.01); *G06F 8/30* (2013.01); *G06F 8/65* (2013.01); *G06F 11/3466* (2013.01); *G06N 20/00* (2019.01)

(58) Field of Classification Search
CPC .......... G06F 8/30; G06F 8/65–70; G06F 8/72; G06N 20/00
See application file for complete search history.

(56) References Cited

U.S. PATENT DOCUMENTS

| 11,042,369 | B1 * | 6/2021 | Kimball | ................ | G06F 9/4843 |
| 2017/0212829 | A1 * | 7/2017 | Bales | ................. | G06F 11/3604 |
| 2019/0213115 | A1 * | 7/2019 | Takawale | ........... | G06F 11/3692 |

OTHER PUBLICATIONS

Aniche, Maurício, et al., The Effectiveness of Supervised Machine Learning Algorithms in Predicting Software Refactoring, IEEE Transactions on Software Engineering, vol. 48, Issue: 4, Apr. 2022, 19 pages, [retrieved on Nov. 7, 2024], Retrieved from the Internet: <URL: http://ieeexplore.ieee.org/>.*
Tufano, Michele, et al., On Learning Meaningful Code Changes via Neural Machine Translation, ICSE '19: Proceedings of the 41st International Conference on Software Engineering, May 2019, 12 pages, [retrieved on Nov. 7, 2024], Retrieved from the Internet: <URL: http://dl.acm.org/>.*

* cited by examiner

*Primary Examiner* — Geoffrey R St Leger
(74) *Attorney, Agent, or Firm* — Greenblum & Bernstein, P.L.C.

(57) ABSTRACT

A method, system, and computer-readable storage medium for providing actionable corrections to, and code refactoring of, executable code. The method comprising: utilizing input to generate a machine learning model that analyzes quantitative information and qualitative information of an execution of an application code; executing the application code within a runtime environment of the application code, either of which incorporates a trace; during the executing, utilizing the trace to collect, at least one metric and/or at least one event; during the executing, ascertaining, by the machine learning model, the quantitative information and the qualitative information, by analyzing the at least one metric and/or the at least one event; and determining, by the machine learning model, at least one correction to the application code and/or at least one refactoring of the application code, by analyzing the quantitative information and the qualitative information.

18 Claims, 5 Drawing Sheets

METHOD AND SYSTEM FOR PROVIDING ACTIONABLE CORRECTIONS TO AND CODE REFACTORING OF EXECUTABLE CODE

BACKGROUND

1. Field of the Invention

The field of the invention disclosed herein generally relates to a system for providing actionable corrections to, and code refactoring of, executable code and, more particularly, to a method, system, and computer-readable storage medium for providing actionable corrections to, and code refactoring of, complex executable code based on an execution of a large set of services.

2. Background of the Invention

Systems like Athena or any other interactive query service that implements one or more standardized programming languages, such as Structured Query Language (SQL) (for example), to manage one or more relational databases (e.g., RDBMS) and to perform various operations on their data, are complex because these systems consist of many related parts. Indeed, the many related parts required to manage conventional relational databases (or any other database implementing one or more conventional programming language standards) perform more operations than any human mind could possibly perform with or without a paper and pencil. For example, conventional relational database systems typically perform thousands of queries per second. Therefore, it is needless to say that it is difficult to understand the various concepts underlying all the related parts involved in the programming of a database management system.

Various tools, such as print statements, debuggers, profilers, and runtime logs, are available to provide some insight on the operations of a database management system application. However, due to the size of such database systems, these tools provide little insight as to which components of a database management application are running unexpectedly and in identifying the errors—such as incorrect application programming interface (API) calls—that are responsible for the unexpected behavior.

Over time, training and experience may help database management system programmers and administrators grasp the various concepts involved in the programming of a database management system. However, system anomalies caused by obscure system issues, such as utilizing unbuffered input/output (I/O), are difficult for even the most experienced and well-trained programmers and system administrators to debug. Similarly, it is also difficult to improve an application's code in ways that make it faster, smaller and/or more resourceful.

As a result, there is a need in this technology for an improvement that solves such technical drawbacks.

SUMMARY

The present disclosure, through one or more of its various aspects, embodiments, and/or specific features or sub-component, provides, inter alia, various systems, servers, devices, methods, media, programs and platforms for providing actionable corrections to, and code refactoring of, executable code.

According to an aspect of the present disclosure, a method is provided for providing actionable corrections to, and code refactoring of, executable code. The method may comprise: receiving, by a processor, input for a machine learning model that analyzes quantitative information and qualitative information. The quantitative information and the qualitative information may relate to an execution of an application code. The method may further comprise: utilizing, by the processor, the input to generate the machine learning model; incorporating, by the processor, a trace into at least one from among the application code and a runtime environment of the application code; executing, by the processor, the application code within the runtime environment of the application code incorporating the trace; during the executing, utilizing, by the processor, the trace to collect, in real-time, at least one from among at least one metric and at least one event. The at least one metric and the at least one event may be generated by the executing. The method may further comprise: during the executing, utilizing, by the processor, the machine learning model to ascertain, in real-time, the quantitative information and the qualitative information, by analyzing the at least one from among the at least one metric and the at least one event; utilizing, by the processor, the machine learning model to determine at least one from among at least one correction to the application code and at least one refactoring of the application code, by analyzing the quantitative information and the qualitative information; and updating, by the processor, the machine learning model based on at least one action that is taken in response to the determination.

The method may further comprise: during the executing, displaying, by the processor, in real-time, via a dashboard, the quantitative information and the qualitative information.

The method may further comprise: during the executing, illustrating, by the processor, an animation that depicts, in real-time, a current state of the runtime environment of the application code.

In the method, the quantitative information and the qualitative information may include at least one alert that is triggered by the at least one from among the at least one metric and the at least one event, and the at least one action may address at least one issue that is indicated by the at least one alert.

In the method, the at least one alert may comprise at least one vulnerability of the application code.

In the method, the at least one action may comprise: implementing, by the processor, the at least one from among the at least one correction to the application code and the at least one refactoring of the application code.

The method may further comprise: based on the at least one action, performing, by the processor, an execution of the application code within the runtime environment of the application code incorporating the trace; based on the performing, utilizing, by the processor, the machine learning model to determine whether a result of the at least one action includes at least one from among correcting the application code and properly refactoring the application code; and further updating, by the processor, the machine learning model based on whether the result of the at least one action includes at least one from among correcting the application code and properly refactoring the application code. A qualitative performance of a properly refactored application code is better than a corresponding performance that is indicated by the qualitative information.

The method may further comprise upon determining that the result of the at least one action does not include the at least one from among the correcting the application code and the properly refactoring the application code: utilizing, by the processor, the machine learning model to further determine at least one from among at least one further correction to the application code and at least one further refactoring of the application code; updating, by the processor, the machine learning model based on at least one further action that is taken in response to the further determining; and based on the at least one further action, performing, by the processor, a further execution of the application code within the runtime environment of the application code incorporating the trace.

In the method, the generating of the machine learning model comprises defining at least one rule that determines, based on the quantitative information and the qualitative information, at least one from among at least one corrective action and at least one code refactoring action. The updating of the machine learning model comprises defining at least one additional rule that determines at least one from among at least one additional corrective action and at least one additional code refactoring action.

In the method, the further updating may comprise at least one from among: modifying at least one rule of the machine learning model; and adding at least one additional rule to the machine learning model. The at least one rule may determine, based on the quantitative information and the qualitative information, at least one from among at least one corrective action and at least one code refactoring action. The at least one additional rule may determine at least one from among at least one additional corrective action and at least one additional code refactoring action.

According to another aspect of the present disclosure, a system is provided for providing actionable corrections to and code refactoring of executable code. The system may comprise: a processor; and memory storing executable instructions that, when executed by the processor, configure the processor to perform various operations. The processor may be configured to: receive input for a machine learning model that analyzes quantitative information and qualitative information; utilize the input to generate the machine learning model; incorporate a trace into at least one from among the application code and a runtime environment of the application code; execute the application code within the runtime environment of the application code incorporating the trace; during the execution, utilize the trace to collect, in real-time, at least one from among at least one metric and at least one event; during the execution, utilize the machine learning model to ascertain, in real-time, the quantitative information and the qualitative information, by analyzing the at least one from among the at least one metric and the at least one event; utilize the machine learning model to determine at least one from among at least one correction to the application code and at least one refactoring of the application code, by analyzing the quantitative information and the qualitative information; and update the machine learning model based on at least one action that is taken in response to the determination. The quantitative information and the qualitative information may relate to an execution of an application code, and the at least one metric and the at least one event may be generated by the execution.

In the system, when executed by the processor, the executable instructions may further configure the processor to: during the execution, display in real-time, via a dashboard, the quantitative information and the qualitative information.

In the system, when executed by the processor, the executable instructions may further configure the processor to: during the execution, illustrate an animation that depicts, in real-time, a current state of the runtime environment of the application code.

In the system, the quantitative information and the qualitative information may include at least one alert that is triggered by the at least one from among the at least one metric and the at least one event, and the at least one action may address at least one issue that is indicated by the at least one alert.

In the system, the at least one alert may comprise at least one vulnerability of the application code.

In the system, the at least one action may comprise: implementing the at least one from among the at least one correction to the application code and the at least one refactoring of the application code.

In the system, when executed by the processor, the executable instructions may further configure the processor to: based on the at least one action, perform an execution of the application code within the runtime environment of the application code incorporating the trace; based on the performing, utilize the machine learning model to determine whether a result of the at least one action includes at least one from among correcting the application code and properly refactoring the application code; and further update the machine learning model based on whether the result of the at least one action includes at least one from among correcting the application code and properly refactoring the application code. A qualitative performance of a properly refactored application code is better than a corresponding performance that is indicated by the qualitative information.

In the system, when executed by the processor, the executable instructions may further configure the processor to: upon determining that the result of the at least one action does not include the at least one from among the correcting the application code and the properly refactoring the application code; utilize the machine learning model to further determine at least one from among at least one further correction to the application code and at least one further refactoring of the application code; update the machine learning model based on at least one further action that is taken in response to the further determining; and based on the at least one further action, perform a further execution of the application code within the runtime environment of the application code incorporating the trace.

In the system, the generation of the machine learning model may comprise defining at least one rule that determines, based on the quantitative information and the qualitative information, at least one from among at least one corrective action and at least one code refactoring action. The update of the machine learning model may comprise defining at least one additional rule that determines at least one from among at least one additional corrective action and at least one additional code refactoring action.

In the system, the further update may comprise at least one from among: modifying at least one rule of the machine learning model; and adding at least one additional rule to the machine learning model. The at least one rule may determine, based on the quantitative information and the qualitative information, at least one from among at least one corrective action and at least one code refactoring action. The at least one additional rule may determine at least one from among at least one additional corrective action and at least one additional code refactoring action.

According to yet a further aspect of the present disclosure, a non-transitory computer-readable medium storing executable instructions is provided for providing actionable corrections to, and code refactoring of, executable code. The executable instructions, when executed by a processor, may configure the processor to: receive input for a machine learning model that analyzes quantitative information and qualitative information. The quantitative information and the qualitative information may relate to an execution of an application code. The executable instructions, when executed by a processor, may further configure the processor to: utilize the input to generate the machine learning model; incorporate a trace into at least one from among the application code and a runtime environment of the application code; execute the application code within the runtime environment of the application code incorporating the trace; and during the execution, utilize the trace to collect, in real-time, at least one from among at least one metric and at least one event. The at least one metric and the at least one event are generated by the execution. The executable instructions, when executed by a processor, may further configure the processor to: during the execution, utilize the machine learning model to ascertain, in real-time, the quantitative information and the qualitative information, by analyzing the at least one from among the at least one metric and the at least one event; utilize the machine learning model to determine at least one from among at least one correction to the application code and at least one refactoring of the application code, by analyzing the quantitative information and the qualitative information; and update the machine learning model based on at least one action that is taken in response to the determination.

In the non-transitory computer-readable storage medium, when executed by the processor, the executable instructions may further configure the processor to: during the execution, display in real-time, via a dashboard, the quantitative information and the qualitative information.

In the non-transitory computer-readable storage medium, when executed by the processor, the executable instructions may further configure the processor to: during the execution, illustrate an animation that depicts, in real-time, a current state of the runtime environment of the application code.

In the non-transitory computer-readable storage medium's instructions, the quantitative information and the qualitative information may include at least one alert that is triggered by the at least one from among the at least one metric and the at least one event, and the at least one action may address at least one issue that is indicated by the at least one alert.

In the non-transitory computer-readable storage medium's instructions, the at least one alert may comprise at least one vulnerability of the application code.

In the non-transitory computer-readable storage medium's instructions, the at least one action may comprise: implementing the at least one from among the at least one correction to the application code and the at least one refactoring of the application code.

In the non-transitory computer-readable storage medium, when executed by the processor, the executable instructions may further configure the processor to: based on the at least one action, perform an execution of the application code within the runtime environment of the application code incorporating the trace; based on the performing, utilize the machine learning model to determine whether a result of the at least one action includes at least one from among correcting the application code and properly refactoring the application code; and further update the machine learning model based on whether the result of the at least one action includes at least one from among correcting the application code and properly refactoring the application code. A qualitative performance of a properly refactored application code is better than a corresponding performance that is indicated by the qualitative information.

In the non-transitory computer-readable storage medium, when executed by the processor, the executable instructions may further configure the processor to: upon determining that the result of the at least one action does not include the at least one from among the correcting the application code and the properly refactoring the application code; utilize the machine learning model to further determine at least one from among at least one further correction to the application code and at least one further refactoring of the application code; update the machine learning model based on at least one further action that is taken in response to the further determining; and based on the at least one further action, perform a further execution of the application code within the runtime environment of the application code incorporating the trace.

In the non-transitory computer-readable storage medium's instructions, the generation of the machine learning model may comprise defining at least one rule that determines, based on the quantitative information and the qualitative information, at least one from among at least one corrective action and at least one code refactoring action. The update of the machine learning model may comprise defining at least one additional rule that determines at least one from among at least one additional corrective action and at least one additional code refactoring action.

In the non-transitory computer-readable storage medium's instructions, the further update may comprise at least one from among: modifying at least one rule of the machine learning model; and adding at least one additional rule to the machine learning model. The at least one rule may determine, based on the quantitative information and the qualitative information, at least one from among at least one corrective action and at least one code refactoring action. The at least one additional rule may determine at least one from among at least one additional corrective action and at least one additional code refactoring action.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
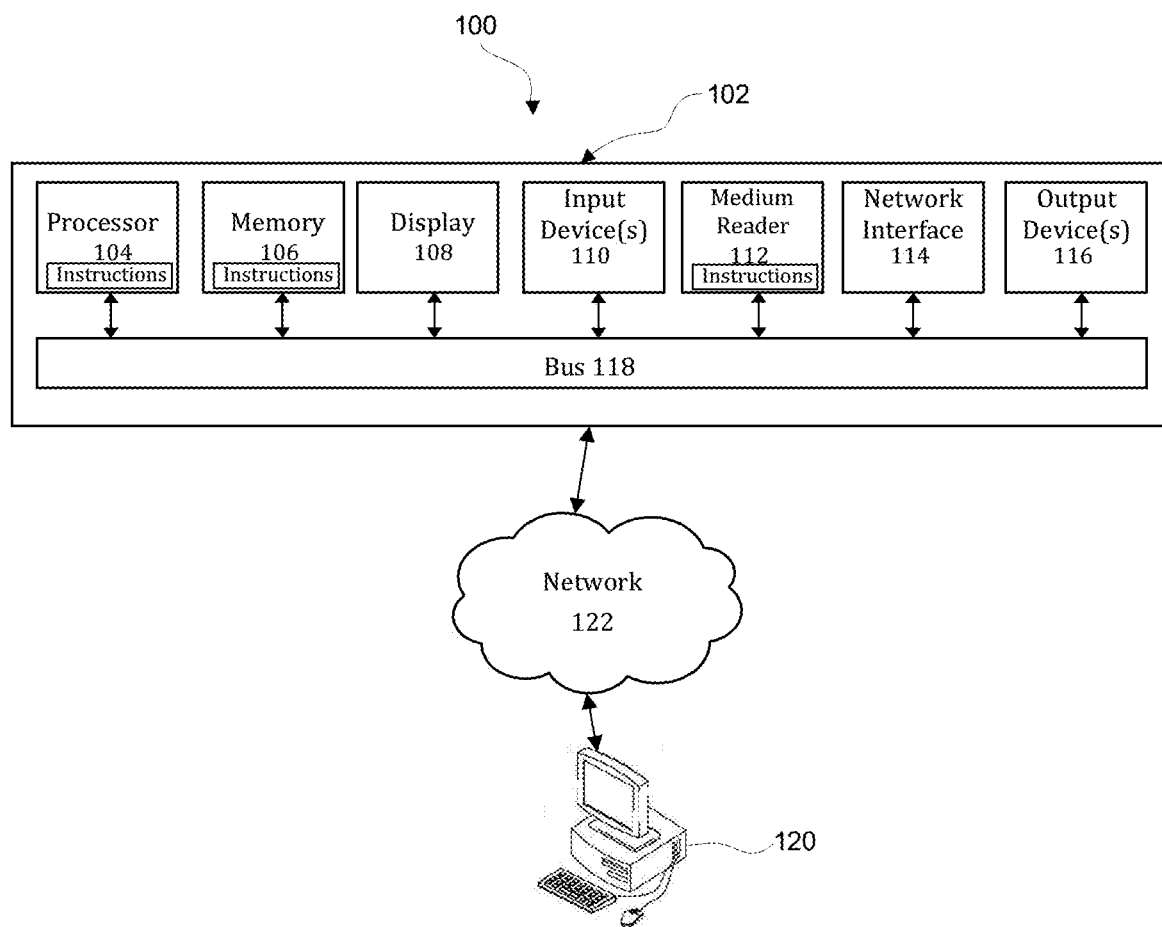
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for implementing a code correction and code refactoring service that improves the overall speed, ease, and user experience of code correction and code refactoring tasks.

Figure 2:
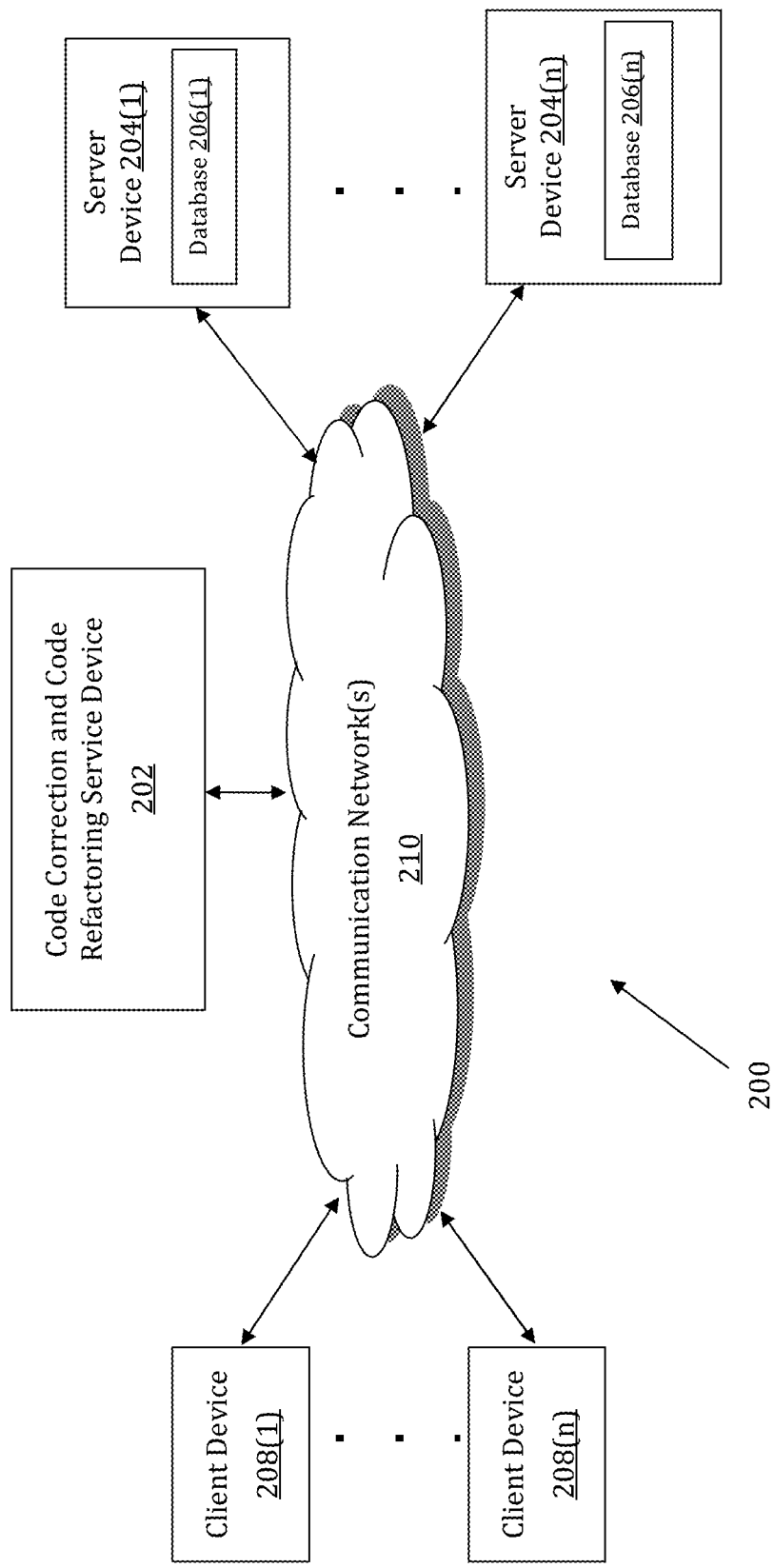
FIG. 2 illustrates an exemplary diagram of a network environment.

Referring to FIG. 2, a schematic of an exemplary network environment 200 for implementing a code correction and code refactoring service that improves the overall speed, ease, and user experience of code correction and code refactoring tasks, is illustrated. In an exemplary embodiment, the method is executable on any networked computer platform, such as, for example, a personal computer (PC).

The method for implementing a code correction and code refactoring service may be implemented by a Code Correction and Code Refactoring Service (CCCRS) device 202. The CCCRS device 202 may be the same or similar to the computer system 102 as described with respect to FIG. 1. The CCCRS device 202 may be a rack-mounted server in a datacenter, an embedded microcontroller (MCU) in an electronic device, or another type of headless system, which is a computer system or device that is configured to operate without a monitor, keyboard and mouse. The CCCRS device 202 may store one or more applications that can include executable instructions that, when executed by the CCCRS device 202, cause the CCCRS device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CCCRS device 202 itself, may be located in virtual server(s) running in a cloud-based computing environment rather than being tied to one or more specific physical network computing devices. Also, the application(s) may be running in one or more virtual machines (VMs) executing on the CCCRS device 202. Additionally, in one or more embodiments of this technology, virtual machine(s) running on the CCCRS device 202 may be managed or supervised by a hypervisor.

In the network environment 200 of FIG. 2, the CCCRS device 202 is coupled to a plurality of server devices 204(1)-204(n) that hosts a plurality of databases 206(1)-206(n), and also to a plurality of client devices 208(1)-208(n) via communication network(s) 210. A communication interface of the CCCRS device 202, such as the network interface 114 of the computer system 102 of FIG. 1, operatively couples and communicates between the CCCRS device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG.

1, although the CCCRS device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, computer readable media, and CCCRS devices that efficiently implement a method for a code correction and code refactoring service that improves the overall speed, ease, and user experience of code correction and code refactoring tasks.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CCCRS device 202 may be a standalone device or integrated with one or more other devices or apparatuses, such as one or more of the server devices 204(1)-204(n), for example. In one particular example, the CCCRS device 202 may include or be hosted by one of the server devices 204(1)-204(n), and other arrangements are also possible. As another example, the CCCRS device 202 may be integrated with one or more other devices or apparatuses, such as one or more of the client devices 208(1)-208(n). Moreover, one or more of the devices of the CCCRS device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CCCRS device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to an application code repository and a machine learning model repository.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the CCCRS device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CCCRS device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CCCRS device 202, the server devices 204(1)-204(n), the databases 206(1)-206(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CCCRS device 202, the server devices 204(1)-204(n), the databases 206(1)-206(n), or the client devices 208(1)-208(n), for example, may be configured to operate as virtual instances on the same physical machine. In other words, one or more of the CCCRS device 202, the server devices 204(1)-204(n), the databases 206(1)-206(n), or the client devices 208(1)-208(n) may operate on the same physical device rather than as separate devices communicating through communication network(s) 210. Additionally, there may be more or fewer CCCRS devices 202, server devices 204(1)-204(n), databases 206(1)-206(n), or client devices 208(1)-208(n) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
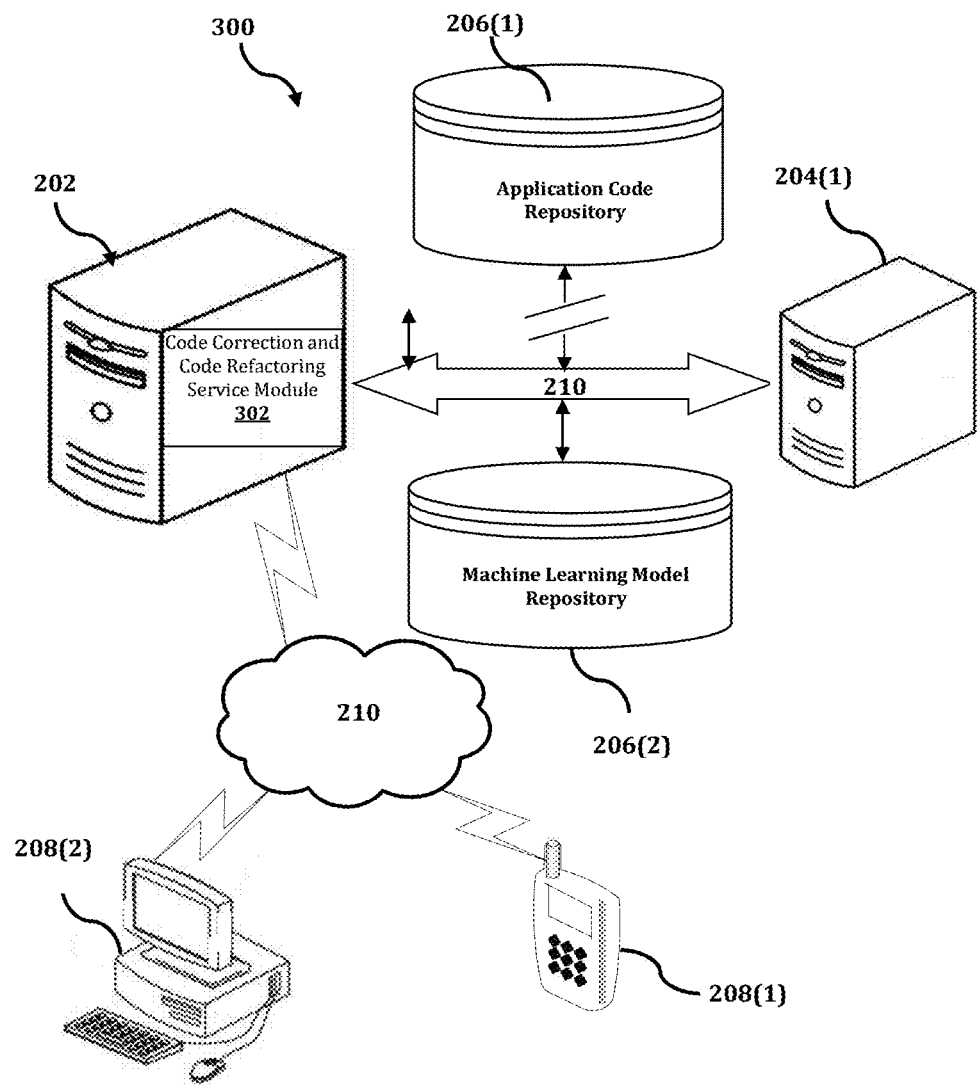
FIG. 3 shows an exemplary system for implementing a code correction and code refactoring service that improves the overall speed, ease, and user experience of code correction and code refactoring tasks.

The CCCRS device 202 is described and illustrated in FIG. 3 as including code correction and code refactoring service module 302, although it may include other rules, policies, modules, databases, or applications, for example. As will be described below, code correction and code refactoring service module 302 is configured to implement a method implementing a code correction and code refactoring service that improves the overall speed, ease, and user experience of code correction and code refactoring tasks. Code correction and code refactoring service module 302 may include software that is based on a microservices architecture.

Code correction and code refactoring service module 302 may be integrated with one or more devices or apparatuses, such as client devices 208(1)-208(n), where code correction and code refactoring service module 302 may be implemented as an application or as an addon or plugin to another application of the one or more devices or apparatuses, and where code correction and code refactoring service module 302 may execute in the background.

An exemplary process 300 for implementing a code correction and code refactoring service by utilizing the network environment of FIG. 2 is illustrated as being executed in FIG. 3. Specifically, a first client device 208(1) and a second client device 208(2) are illustrated as being in communication with CCCRS device 202. In this regard, the first client device 208(1) and the second client device 208(2) may be "clients" of the CCCRS device 202 and are described herein as such. Nevertheless, it is to be known and understood that the first client device 208(1) and/or the second client device 208(2) need not necessarily be "clients" of the CCCRS device 202, or any entity described in association therewith herein. Any additional or alternative relationship may exist between either or both of the first client device 208(1) and the second client device 208(2) and the CCCRS device 202, or no relationship may exist.

Further, CCCRS device 202 is illustrated as being able to access application code repository 206(1), and machine learning model repository 206(2). CCCRS device 202 may comprise code correction and code refactoring service that communicates with application code repository 206(1). In addition, the code correction and code refactoring service of CCCRS device 202 may also communicate with machine learning model repository 206(2). The code correction and code refactoring service module 302 may be configured to access these databases for implementing a code correction and code refactoring service that improves the overall speed, ease, and user experience of code correction and code refactoring tasks.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(n) may represent, for example, computer systems of an organization or database network. The first client device 208(1) represent, for example, one or more computer systems of a department or cluster within the organization or database network. Of course, the first client device 208(1) may include one or more of any of the devices described herein. The second client device 208(2) may be, for example, one or more computer systems of another department or cluster within the organization or database network. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the CCCRS device 202 via broadband or cellular communication. Of course, these embodiments are merely exemplary and are not limiting or exhaustive.

Code correction and code refactoring service module 302 may execute a process for implementing a code correction and code refactoring service that improves the overall speed, ease, and user experience of code correction and code refactoring tasks. An exemplary process for implementing a code correction and code refactoring service is generally indicated at flowchart 400 in FIG. 4.

Figure 4:
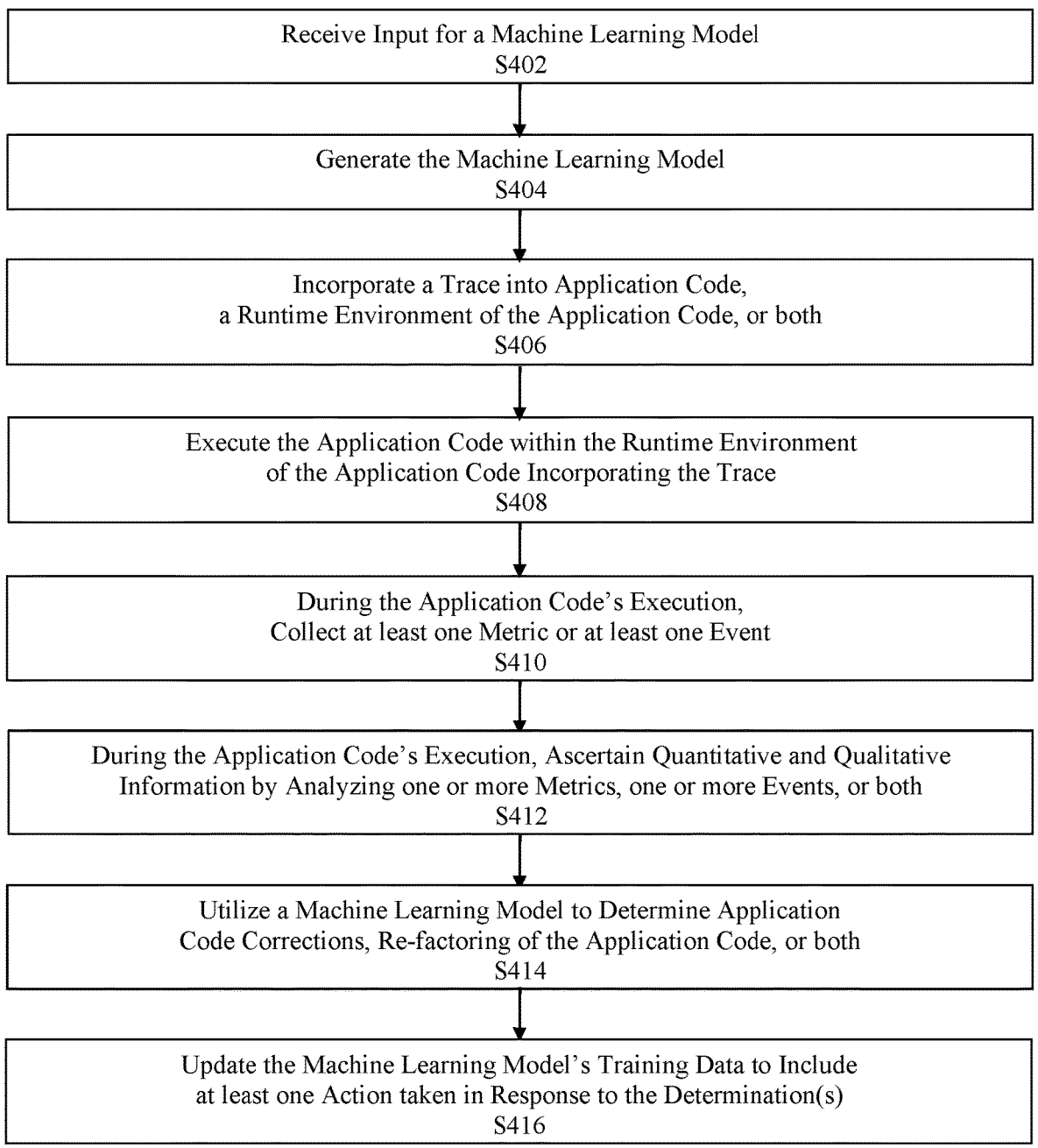
FIG. 4 is a flowchart of an exemplary process for implementing a code correction and code refactoring service that improves the overall speed, ease, and user experience of code correction and code refactoring tasks.

In process 400 of FIG. 4, at step S402, code correction and code refactoring service module 302 receives input for a machine learning (ML) model. The input for the ML model may be provided manually by one or more individuals, retrieved from memory, received from a communication network (such as, the Internet or network 122/210), obtained from a source of real-time data, and/or generated by any other input source. A user may use a device such as client device 208(1) or client device 208(2) to provide the input for the ML model, and the input for the ML model may be gathered through data mining.

At step S404, the code correction and code refactoring service module 302 utilizes the received input to generate the ML model. Code correction and code refactoring service module 302 may generate the ML model by utilizing the received input as training data for the ML model's decision-making algorithms. Accordingly, the ML model's decision-making may be improved and adjusted by the received input and any subsequent updates to the input or training data. The ML model's decision-making algorithms may be based on one or more various artificial intelligence techniques, such as deep learning, neural networks, or both.

At step S406, code correction and code refactoring service module 302 incorporates a trace into application code, a runtime environment of the application code, or both. The trace is a module that can obtain diagnostic information about executable code (e.g., the application code) during the execution of such code, without interrupting the execution to obtain feedback from the code's runtime environment. The application code may be a service-oriented application.

After step S406 (i.e., incorporating the trace into the application code, a runtime environment of the application code, or both), at step S408, code correction and code refactoring service module 302 initiates execution of the application code within the runtime environment of the application code incorporating the trace.

After step S408, during the execution of the application code within the runtime environment of the application code incorporating the trace, at step S410, code correction and code refactoring service module 302 utilizes the trace to collect at least one metric, at least one event, or both. The at least one metric, the at least one event, or both, may be information that is generated in response to the execution of the application code, such as diagnostics information about the application code. Code correction and code refactoring service module 302 may collect the at least one metric, the at least one event, or both, in real-time. Real-time refers to latencies that are no greater than 300 milliseconds (ms). Although real-time typically refers to latencies in the order of 6 to 20 ms, real-time may refer to any latency of 300 ms or less, such as latencies in the order of one or more milliseconds, or even latencies in the order of one or more microseconds.

During the execution of the application code within the runtime environment of the application code incorporating the trace, code correction and code refactoring service module 302 may also provide the at least one metric, the at least one event, or both, to a dashboard for display. The dashboard may display the at least one metric, the at least one event, or both, in real-time. Code correction and code refactoring service module 302 may provide the at least one metric, the at least one event, or both, as an illustration or an animation to be displayed on the dashboard in real-time. The illustration or animation may depict the current state of the runtime environment of the application code in real-time.

During step S410, and during the execution of the application code within the runtime environment of the application code incorporating the trace, at step S412, code correction and code refactoring service module 302 ascertains quantitative information about the application code, qualitative information about the application code, or both, by analyzing the at least one metric, the at least one event, or both. Code correction and code refactoring service module 302 may utilize the ML model to ascertain the quantitative information, the qualitative information, or both. Code correction and code refactoring service module 302 may ascertain the quantitative information, the qualitative information, or both, in real-time.

During step S412, the quantitative information and the qualitative information may include at least one alert that is triggered by the at least one metric, the at least one event, or both. The at least one alert may be communicated via an interface of one or more of a programmer, administrator, and other user of the disclosed system. The at least one alert may comprise at least one vulnerability. The at least one vulnerability may be a vulnerability of the application code.

During step S410, and during the execution of the application code within the runtime environment of the application code incorporating the trace, code correction and code refactoring service module 302 may also provide the quantitative information, the qualitative information, or both, to the dashboard for display. The dashboard may display the quantitative information, the qualitative information, or both, in real-time. Code correction and code refactoring service module 302 may provide the quantitative information, the qualitative information, or both, as an illustration or an animation to be displayed on the dashboard in real-time. This illustration or animation may also depict the current state of the runtime environment of the application code in real-time.

At step S414, code correction and code refactoring service module 302 utilizes the ML model to determine at least one correction to the application code, at least one refactoring of the application code, or both, by analyzing the quantitative information and the qualitative information. Code correction and code refactoring service module 302 may similarly determine at least one correction to the application code, at least one refactoring of the application code, or both, by analyzing the at least one metric, the at least one event, or both. Since this latter determination may simply rely on the at least one metric, the at least one event, or both, one of the many advantages of the present disclosure is that this particular determination may actually be made in real-time, during step S410.

Code correction and code refactoring service module 302 may generate the ML model by defining at least one rule that determines at least one corrective action, at least one code refactoring action, or both, based on the quantitative information and the qualitative information ascertained at step S412.

After step S414, code correction and code refactoring service module 302 may implement the at least one correction to the application code, the at least one refactoring of the application code, or both. However, code correction and code refactoring service module 302 may refrain from implementing the at least one correction to the application code, the at least one refactoring of the application code, or both.

At step S416, code correction and code refactoring service module 302 may update the ML model based on at least one action that is taken in response to the determination. The at least one action that is taken in response to determining the at least one correction to the application code, the at least one refactoring of the application code, or both, may be an action taken by the programmer, administrator or other users of the disclosed system. However, code correction and code refactoring service module 302 may also operate to autonomously take this action in response to determining the at least one correction to the application code, the at least one refactoring of the application code, or both.

The at least one action may be taken to address at least one issue that is indicated by analyzing the quantitative information, the qualitative information, or both. The at least one action may also be taken in response to the at least one alert. The at least one action may be the implementation of the at least one correction to the application code, the at least one refactoring of the application code, or both. The at least one action may be based on training data of the ML model.

At step S416, the update to the ML model may be based on results of the action taken in response to determining the at least one correction to the application code, the at least one refactoring of the application code, or both. At step S416, the update to the ML model may be utilized to train the ML model. At step S416, the update to the ML model may be utilized to compile training data for the ML model. At step S416, the update to the ML model may be utilized by code correction and code refactoring service module 302, to determine the at least one correction to the application code, the at least one refactoring of the application code, or both.

Indeed, code correction and code refactoring service module 302 may update the ML model by defining and adding at least one additional rule that determines at least one additional corrective action, at least one additional code refactoring action, or both. Code correction and code refactoring service module 302 may update the ML model by modifying at least one rule of the machine learning model. Based on the quantitative information and the qualitative information, the at least one rule, the at least one additional rule, or both, may determine at least one additional corrective action, at least one additional code refactoring action, or both.

After step S414, code correction and code refactoring service module 302 may execute the application code within the runtime environment of the application code in accordance with the at least one action. Based on this execution, code correction and code refactoring service module 302 may utilize the ML model to determine whether the at least one action corrects the application code, properly refactors the application code, or both. Based on this determination, code correction and code refactoring service module 302 may update the ML model again. Based on this determination, code correction and code refactoring service module 302 may continuously update the ML model. The input data may be a data stream.

Code correction and code refactoring service module 302 may utilize the ML model to determine whether the at least one action, corrects the application code, properly refactors the application code, or both. Based on this determination, code correction and code refactoring service module 302 may utilize the ML model to further determine at least one additional correction to the application code, at least one additional refactoring of the application code, or both. Code correction and code refactoring service module 302 may update the ML model based on at least one additional action that is taken in response to the further determination of the at least one additional correction to the application code, at least one additional refactoring of the application code, or both. Based on the at least one additional action, code correction and code refactoring service module 302 may perform a further execution of the application code within the runtime environment of the application code incorporating the trace.

Regarding the at least one action that corrects the application code, it should be noted that the at least one action may correct any application code issue, such as one or more incorrect API calls, unbuffered I/O, or both, for example. Regarding a proper refactoring of the application code, it should be noted that a qualitative performance of a properly refactored application code is better than a corresponding performance indicated by the qualitative information that was ascertained, at step S412, before the application code was refactored.

Accordingly, with this technology, a process for providing actionable corrections to, and code refactoring of, executable code, is provided.

Figure 5:
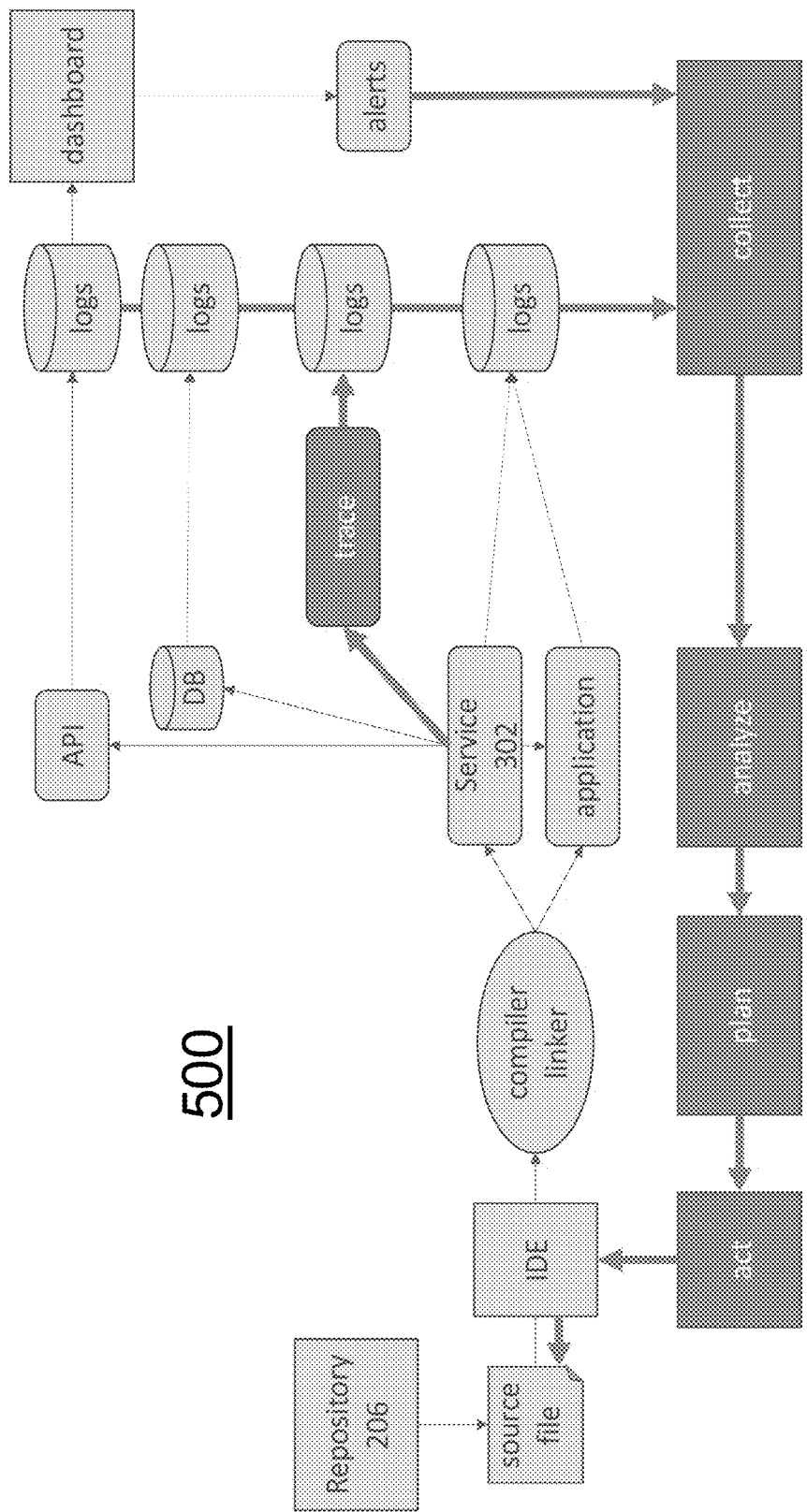
FIG. 5 is an exemplary system for applying a code correction and code refactoring service.

An exemplary system for applying a code correction and code refactoring service is generally indicated at an exemplary database network environment 500 in FIG. 5.

Database network environment 500 comprises one or more databases (DB) and application code repository 206(1), which stores executable code of applications that may provide services utilized in the management of a database network environment, such as database network environment 500. For example, the "source file" illustrated in FIG. 5 is the executable code of an exemplary application. The "source file" illustrated in FIG. 5 may be the executable code of a service-oriented application, and application code repository 206(1) may store one or more service-oriented applications.

The "source file" illustrated in FIG. 5 may be retrieved from application code repository 206(1) and developed or modified within an integrated development environment (IDE) such as the IDE illustrated in FIG. 5. After being developed or modified within an IDE, the "source file" may be processed by a "compiler linker" for execution. The "compiler linker" may compile the source file into one or more object files and, then, link or combine the one or more object files into a single executable file for execution. Upon execution, the single executable file may comprise an application, a service, or both (e.g., service-oriented applications).

As set forth above, during execution of the single executable file, at step S410, code correction and code refactoring service module 302 may utilize a trace to collect at least one metric, at least one event, or both, from database network environment 500. The at least one metric, the at least one event, or both, which may have been collected, at step S410, by the trace, may be stored in one or more logs. Logs may be maintained of other information as well. For example, logs may be made for one or more application transactions, service transactions, application programming interface (API) communications, and database (DB) transactions. The logs depicted in FIG. 5 are a sink, including the dashboard and alerts depicted in FIG. 5.

The logs of database network environment 500 may be displayed on one or more dashboards, such as the "dashboard" illustrated in FIG. 5. Also, the logs of database network environment 500 may trigger one or more alerts, such as the "alerts" illustrated in FIG. 5. Code correction and code refactoring service module 302 may collect one or more logs, one or more alerts, or both, for analysis.

Code correction and code refactoring service module 302 may utilize the ML model to analyze the one or more logs, the one or more alerts, or both, that were collected for analysis. Based on this analysis, code correction and code refactoring service module 302 may utilize the ML model to determine at least one correction to the application code, at least one refactoring of the application code, or both. However, the analysis (depicted in FIG. 5 as "analyze"), this determination, or both, may also be performed manually by an individual.

After the analysis illustrated in FIG. 5 is conducted, plans may be made on how to address any issues that are revealed by the analysis illustrated in FIG. 5. The plan may include actually implementing the at least one correction to the application code, the at least one refactoring of the application code, or both, that were determined by code correction and code refactoring service module 302 at step S414. However, the plan may include an alternative to the determination of step S414. Indeed, the plan may also include a supplement to the determination of step S414.

After the planning illustrated at FIG. 5 is performed, action may be taken in response to the planning. For example, the action that is taken may be an actual implementation of the at least one correction to the application code, the at least one refactoring of the application code, or both, that were determined by code correction and code refactoring service module 302 at step S414. However, the action may be an alternative to the one or more actions determined at step S414. The action that is taken may be to develop or modify the "source file," and the action may be taken in an integrated development environment (IDE), such as the IDE illustrated in FIG. 5.

Accordingly, with this technology, a process for providing actionable corrections to, and code refactoring of, executable code, may be applied to a database network environment, such as database network environment 500, which may include one or more databases (DB) and where one or more of the one or more databases (DB) may be a relational database or otherwise.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

The invention claimed is:

1. A method for providing actionable corrections to and code refactoring of executable code, the method comprising:
   receiving, by a processor, input for a machine learning model that analyzes quantitative information and qualitative information, wherein the quantitative information and the qualitative information relate to an execution of an application code;
   utilizing, by the processor, the input to generate the machine learning model;
   incorporating, by the processor, a trace into at least one from among the application code and a runtime environment of the application code;
   executing, by the processor, the application code within the runtime environment of the application code incorporating the trace;
   during the executing, utilizing, by the processor, the trace to collect, in real-time, at least one from among at least one metric and at least one event, wherein the at least one metric and the at least one event are generated by the executing;
   during the executing, utilizing, by the processor, the machine learning model to ascertain, in real-time, the quantitative information and the qualitative information, by analyzing the at least one from among the at least one metric and the at least one event;
   utilizing, by the processor, the machine learning model to determine at least one from among at least one correction to the application code and at least one refactoring of the application code, by analyzing the quantitative information and the qualitative information;

updating, by the processor, the machine learning model based on at least one action that is taken in response to the determination;

based on the at least one action, performing, by the processor, an execution of the application code within the runtime environment of the application code incorporating the trace;

based on the performing, utilizing, by the processor, the machine learning model to determine whether a result of the at least one action includes at least one from among correcting the application code and properly refactoring the application code; and further updating, by the processor, the machine learning model based on whether the result of the at least one action includes at least one from among correcting the application code and properly refactoring the application code, wherein a qualitative performance of a properly refactored application code is better than a corresponding performance that is indicated by the qualitative information.

2. The method of claim 1, further comprising:
during the executing, displaying, by the processor, in real-time, via a dashboard, the quantitative information and the qualitative information.

3. The method of claim 1, further comprising:
during the executing, illustrating, by the processor, an animation that depicts, in real-time, a current state of the runtime environment of the application code.

4. The method of claim 1, wherein:
the quantitative information and the qualitative information include at least one alert that is triggered by the at least one from among the at least one metric and the at least one event; and
the at least one action addresses at least one issue that is indicated by the at least one alert.

5. The method of claim 4, wherein the at least one alert comprises at least one vulnerability of the application code.

6. The method of claim 1, wherein the at least one action comprises:
implementing, by the processor, the at least one from among the at least one correction to the application code and the at least one refactoring of the application code.

7. The method of claim 1, the method further comprising upon determining that the result of the at least one action does not include the at least one from among the correcting the application code and the properly refactoring the application code:
utilizing, by the processor, the machine learning model to further determine at least one from among at least one further correction to the application code and at least one further refactoring of the application code;
updating, by the processor, the machine learning model based on at least one further action that is taken in response to the further determining; and
based on the at least one further action, performing, by the processor, a further execution of the application code within the runtime environment of the application code incorporating the trace.

8. The method of claim 1, wherein:
the generating of the machine learning model comprises defining at least one rule that determines, based on the quantitative information and the qualitative information, at least one from among at least one corrective action and at least one code refactoring action; and
the updating of the machine learning model comprises defining at least one additional rule that determines at least one from among at least one additional corrective action and at least one additional code refactoring action.

9. The method of claim 1, wherein the further updating comprises at least one from among:
modifying at least one rule of the machine learning model, wherein the at least one rule determines, based on the quantitative information and the qualitative information, at least one from among at least one corrective action and at least one code refactoring action; and
adding at least one additional rule to the machine learning model, wherein the at least one additional rule determines at least one from among at least one additional corrective action and at least one additional code refactoring action.

10. A system for providing actionable corrections to and code refactoring of executable code, the system comprising:
a processor; and
memory storing executable instructions that, when executed by the processor, configure the processor to:
receive input for a machine learning model that analyzes quantitative information and qualitative information, wherein the quantitative information and the qualitative information relate to an execution of an application code;
utilize the input to generate the machine learning model;
incorporate a trace into at least one from among the application code and a runtime environment of the application code;
execute the application code within the runtime environment of the application code incorporating the trace;
during the execution, utilize the trace to collect, in real-time, at least one from among at least one metric and at least one event, wherein the at least one metric and the at least one event are generated by the execution;
during the execution, utilize the machine learning model to ascertain, in real-time, the quantitative information and the qualitative information, by analyzing the at least one from among the at least one metric and the at least one event;
utilize the machine learning model to determine at least one from among at least one correction to the application code and at least one refactoring of the application code, by analyzing the quantitative information and the qualitative information;
update the machine learning model based on at least one action that is taken in response to the determination;
based on the at least one action, perform an execution of the application code within the runtime environment of the application code incorporating the trace;
based on the performance, utilize the machine learning model to determine whether a result of the at least one action includes at least one from among correcting the application code and properly refactoring the application code; and
further update the machine learning model based on whether the result of the at least one action includes at least one from among correcting the application code and properly refactoring the application code,
wherein a qualitative performance of a properly refactored application code is better than a corresponding performance that is indicated by the qualitative information.

11. The system of claim 10, wherein, when executed by the processor, the executable instructions further configure the processor to:
  during the execution, display in real-time, via a dashboard, the quantitative information and the qualitative information.

12. The system of claim 10, wherein, when executed by the processor, the executable instructions further configure the processor to:
  during the execution, illustrate an animation that depicts, in real-time, a current state of the runtime environment of the application code.

13. The system of claim 10, wherein:
  the quantitative information and the qualitative information include at least one alert that is triggered by the at least one from among the at least one metric and the at least one event; and
  the at least one action addresses at least one issue that is indicated by the at least one alert,
  wherein the at least one alert comprises at least one vulnerability of the application code.

14. The system of claim 10, wherein the at least one action comprises:
  implementing the at least one from among the at least one correction to the application code and the at least one refactoring of the application code.

15. The system of claim 10, wherein, when executed by the processor, the executable instructions further configure the processor to, upon determining that the at least one action does not include the at least one from among the correcting the application code and the properly refactoring the application code:
  utilize the machine learning model to further determine at least one from among at least one further correction to the application code and at least one further refactoring of the application code;
  update the machine learning model based on at least one further action that is taken in response to the further determining; and
  based on the at least one further action, perform a further execution of the application code within the runtime environment of the application code incorporating the trace.

16. The system of claim 10, wherein:
  the generation of the machine learning model comprises defining at least one rule that determines, based on the quantitative information and the qualitative information, at least one from among at least one corrective action and at least one code refactoring action; and
  the update of the machine learning model comprises defining at least one additional rule that determines at least one from among at least one additional corrective action and at least one additional code refactoring action.

17. The system of claim 10, wherein the further update comprises at least one from among:
  modifying at least one rule of the machine learning model, wherein the at least one rule determines, based on the quantitative information and the qualitative information, at least one from among at least one corrective action and at least one code refactoring action; and
  adding at least one additional rule to the machine learning model, wherein the at least one additional rule determines at least one from among at least one additional corrective action and at least one additional code refactoring action.

18. A non-transitory computer-readable medium storing executable instructions for providing actionable corrections to and code refactoring of executable code, the executable instructions, when executed by a processor, configure the processor to:
  receive input for a machine learning model that analyzes quantitative information and qualitative information, wherein the quantitative information and the qualitative information relate to an execution of an application code;
  utilize the input to generate the machine learning model;
  incorporate a trace into at least one from among the application code and a runtime environment of the application code;
  execute the application code within the runtime environment of the application code incorporating the trace;
  during the execution, utilize the trace to collect, in real-time, at least one from among at least one metric and at least one event, wherein the at least one metric and the at least one event are generated by the execution;
  during the execution, utilize the machine learning model to ascertain, in real-time, the quantitative information and the qualitative information, by analyzing the at least one from among the at least one metric and the at least one event;
  utilize the machine learning model to determine at least one from among at least one correction to the application code and at least one refactoring of the application code, by analyzing the quantitative information and the qualitative information;
  update the machine learning model based on at least one action that is taken in response to the determination;
  based on the at least one action, perform, by the processor, an execution of the application code within the runtime environment of the application code incorporating the trace;
  based on the performance, utilize, by the processor, the machine learning model to determine whether a result of the at least one action includes at least one from among correcting the application code and properly refactoring the application code; and
  further update, by the processor, the machine learning model based on whether the result of the at least one action includes at least one from among correcting the application code and properly refactoring the application code,
  wherein a qualitative performance of a properly refactored application code is better than a corresponding performance that is indicated by the qualitative information.

* * * * *